US012796653B2

(12) United States Patent
Gates

(10) Patent No.: US 12,796,653 B2
(45) Date of Patent: Nov. 17, 2026

(54) FEED DISPENSING PLATE

(71) Applicant: All Seasons Feeders, Ltd., San Antonio, TX (US)

(72) Inventor: William Zachary Gates, San Antonio, TX (US)

(73) Assignee: All Seasons Feeders, Ltd., San Antonio, TX (US)

( * ) Notice: Subject to any disclaimer, the term of this patent is extended or adjusted under 35 U.S.C. 154(b) by 0 days.

(21) Appl. No.: 19/171,732

(22) Filed: Apr. 7, 2025

(65) Prior Publication Data

US 2026/0150810 A1 Jun. 4, 2026

Related U.S. Application Data

(60) Provisional application No. 63/726,756, filed on Dec. 2, 2024.

(51) Int. Cl.

*A01K 5/02* (2006.01)
*A01C 17/00* (2006.01)

(52) U.S. Cl.

CPC .............. *A01K 5/02* (2013.01); *A01C 17/003* (2013.01); *A01K 5/0225* (2013.01)

(58) Field of Classification Search

CPC ...... A01K 5/02; A01K 5/0225; A01C 17/001; A01C 17/003
USPC ......................................... 239/681, 687, 689
See application file for complete search history.

(56) References Cited

U.S. PATENT DOCUMENTS

| | | | | |
|---|---|---|---|---|
| 4,986,220 A | | 1/1991 | Reneau et al. | |
| 6,763,781 B1 | | 7/2004 | Norrell | |
| 2006/0283396 A1 | * | 12/2006 | Hernandez | A01K 5/0225 119/51.01 |
| 2010/0288859 A1 | * | 11/2010 | Chism | E01H 10/007 239/650 |
| 2011/0088627 A1 | * | 4/2011 | Gates | A01K 5/02 119/57.91 |
| 2012/0085289 A1 | * | 4/2012 | Quiring | A01K 5/0225 119/57.91 |
| 2015/0336118 A1 | * | 11/2015 | Myers | A01K 5/00 239/684 |
| 2019/0099779 A1 | * | 4/2019 | Farmer | E01C 19/203 |
| 2019/0246599 A1 | * | 8/2019 | Byrum | A01K 5/0291 |

OTHER PUBLICATIONS

International Search Report and Written Opinion dated Jan. 27, 2026 from related international application PCT/US2025/057076 (13 pages).

* cited by examiner

*Primary Examiner* — Cody J Lieuwen
(74) *Attorney, Agent, or Firm* — Braxton IP PLLC; Bobby W. Braxton

(57) ABSTRACT

A system and method for a spinner plate for use in a feeder is disclosed. The spinner plate has a void through which to receive feed. The spinner plate has at least one exit through which feed is to be dispensed. There is at least one outer flap located adjacent to said at least one exit. The flap can pivot between a closed and open position. The system also includes a biasing mechanism to urge the spinner plate between a downward and upward positions. The system can also include an inner flap upstream of the downstream flap. The flaps stop the flow of feed and prevent animals from gaining access to the feed.

17 Claims, 4 Drawing Sheets

FEED DISPENSING PLATE

PRIORITY

The present invention claims priority to U.S. Provisional 63/726,756 filed Dec. 2, 2024, the entirety of which is hereby incorporated by reference.

BACKGROUND OF THE INVENTION

Technical Field

The present invention relates to a system and method for a seed dispensing plate.

Description of Related Art

Animal feeders exist which provide feed for various animals such as deer, elk, etc. However, the feed can often become the target of mice, rodents, etc. Consequently, there is a need for an improved feeder and dispensing plate.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
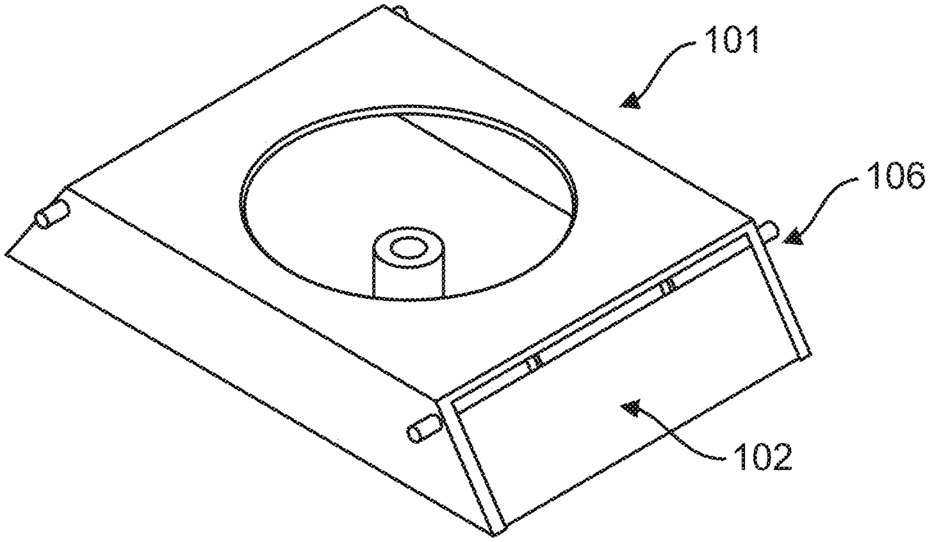
FIG. 1 is a perspective view of the spinner plate in one embodiment.
Figure 2:
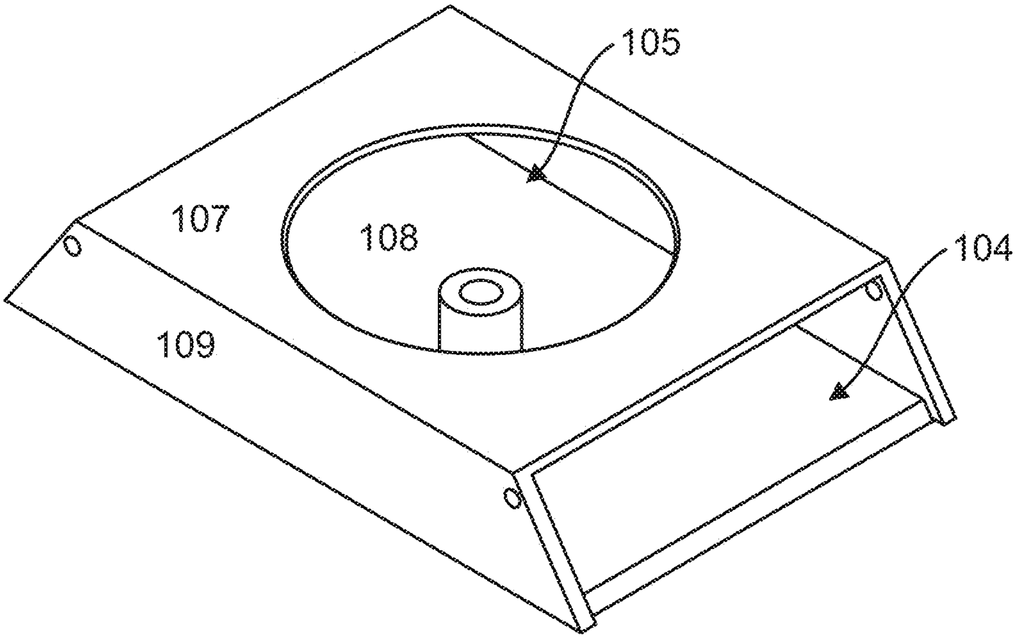
FIG. 2 is a perspective view of the spinner plate with the flap removed in one embodiment.

Turning to FIG. 1, FIG. 1 is a perspective view of the spinner plate 101 in one embodiment. FIG. 2 is a perspective view of the spinner plate 101 with the flap 102 removed in one embodiment to show the exits 104.

The spinner plate 101 has a spinner plate top 107 connected to a spinner plate bottom 108 via sides 109. The plate top 107 and the plate bottom 108 are parallel. As shown, the length of the plate bottom 108 is greater than the length of the plate top 107. As shown, the sides 109 are perpendicular to an open exit 104. As shown, the sides 109 intersect the open exit 104 at an angle, thus the exits 104 are angled relative to the bottom 108 and top 107. This is because the top plate 107 is shorter than the bottom plate 108. The specific angle of intersection between the exit and the bottom plate 108 will vary depending upon the relative lengths of the top 107 and bottom plates 108.

Feed is delivered to the spinner plate 101 via the void 105 (as shown in FIG. 2). Virtually any feed can be utilized. This can include deer feed, seeds, or other granular items.

The feed can be delivered to the spinner plate 101 via a variety of methods. In one embodiment the feed is gravity fed downward to the spinner plate 101 through the void 105. The feed can be stored in a trough or other holding storage container.

The spinner plate 101 is rotated by a rotating device (not depicted). Various rotating devices can be utilized. In one embodiment the spinner plate 101 is coupled, either directly or indirectly to a motor via the spinner coupler 103, discussed later herein. In one embodiment the spinner coupler 103 couples to a rotating device located below the spinner coupler 103.

In one embodiment the spinner plate 101 is moveable vertically in the up and down direction. Initially, in one embodiment, the spinner plate 101 is biased in the downward position via springs. However, once spinning of the spinner plate 101 is initiated, the centrifugal force pulls the spring-loaded plates up so feed or grain or granular item can be dispersed and spun about. Thus, the spinner plate 101 comprises two extreme positions: a downward position and an upward position.

In the upward position the spinner plate 101 is spinning and dispensing feed as it does so. Conversely, in the downward position, the spinner plate 101 is not dispensing feed.

Various springs and other mechanisms can be used to bias the spinner plate 101 in the desired location. For example, the springs can pull the spinner plate 101 downward, but the downward force of the springs is overcome by the centrifugal force of the rotating spinner plate 101, and consequently, the spinner plate 101 moves upward. Various biasing mechanisms can be used. They can provide tension or force, depending upon their placement.

It should be noted that while one embodiment has been described wherein the spinner plate 101 is urged to the upward position to dispense feed, in other embodiments the opposite is true. In such embodiments the spinner plate 101 is urged downward to dispense feed.

As noted in one embodiment the spinner plate has two opposing exits 104. The two opposing exits 104 are located on opposite ends of the spinning plate 101. In one embodiment the opposing exists 104 are located perpendicular to the length of the spinning plate 101, with the length being the longest dimension of the spinning plate 101. Feed is dispensed through the exits 104. When the spinner plate 101 is spinning, the centrifugal force directs feed to the exits 104. Feed is slung outward via the rotation of the spinner plate 101. The feed can be spread, as desired, adjacent to the feeder.

The exits 104 can simply comprise an opening. In other embodiments they can comprise ramps, obstacles, etc. to modify the distribution pattern.

FIG. 2 shows the exits 104 with the outer flaps 102 removed. FIG. 1, however, shows the flaps 102 which cover the exits 104. The outer flaps 102 serve a variety of purposes. As shown in FIG. 1, the outer flap 102 is down. This prevents entry into the spinner plate 101 from rodents, varmints, etc. Thus, the outer flaps 102 offer protection of the feed and ensure it is dispensed to the desired animal. If varmints, rodents, etc. are allowed entry into the spinner plate 101, not only can they eat the feed not intended for them, they can leave feces, diseases, etc. Thus, preventing entry into the spinning plate 101 is very advantageous.

The outer flaps 102, as shown, can raise or lower with minimal force. Because, in one embodiments, the outer flaps 102 are wider than the exit 104, a force toward the exit 104 will not move the flaps 102. Thus, an animal attempting to gain entry by pushing the flaps 102 toward the exit 104 will be unsuccessful. However, when the spinner plate 101 is rotated, the centrifugal force causes the outer flaps 102 to rotate about the hinge 106, which couples the flaps 102 to the spinner plate 101. The hinge 106 can comprise an unbiased hinge. In other embodiments, the hinge 106 can comprise a biased hinge 106 which maintains the flap 102 in the desired shut location until sufficient force is applied to overcome the biased force.

While one embodiment has been described wherein the outer flaps 102 are wider than the exit, in other embodiments, the outer flaps 102 are not wider than the exit 104. Instead, the outer flaps 102 are longer than the exit opening such that the outer flaps 102 cannot rotated inwardly.

As noted, the outer flaps 102 comprise a closed position wherein they are adjacent to the exit. When the spinner plate 101 rotates, the outer flaps 102 rotate about the hinge 106 to an open position wherein the outer flaps 102 are not adjacent to the exit.

Figure 3:
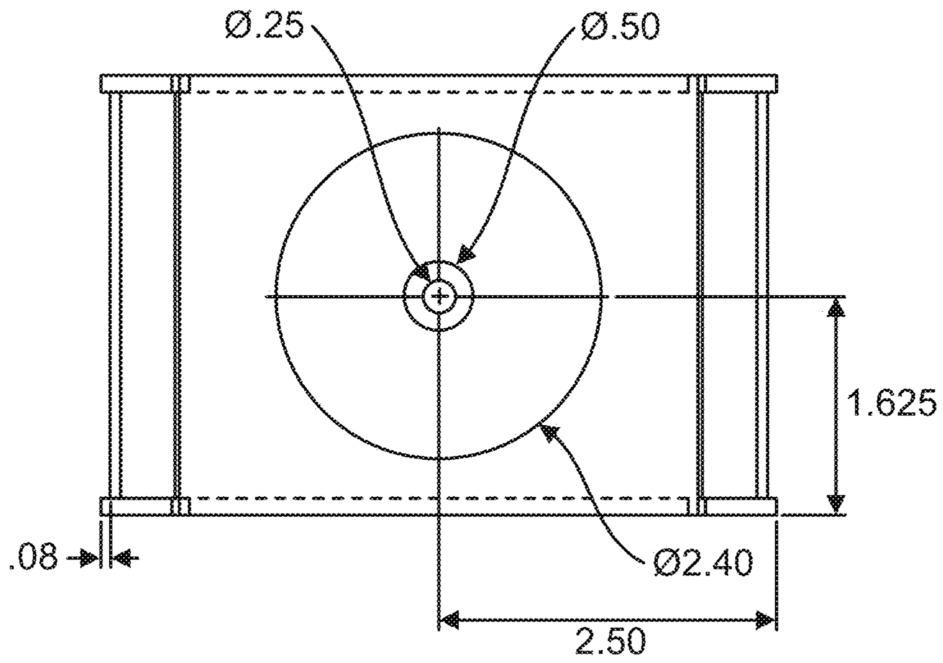
FIG. 3 is a top view of the spinner plate in one embodiment.

Turning to FIG. 3, FIG. 3 is a top view of the spinner plate 101 in one embodiment. As can be seen, the void 105 is located on the top portion of the spinner plate 101. Thus, the void 105 is located on the top plate 107. As depicted, the spinner plate 101 has a top plate 107 with a length that is shorter than the length of the bottom plate 108. As depicted, the void 105 does not extend into the bottom plate 108. Food, seed, etc., is not allowed to fall through the bottom plate 108, whereas food, seed, etc. is allowed to fall through the top plate 107 via the void 105.

Figure 4:
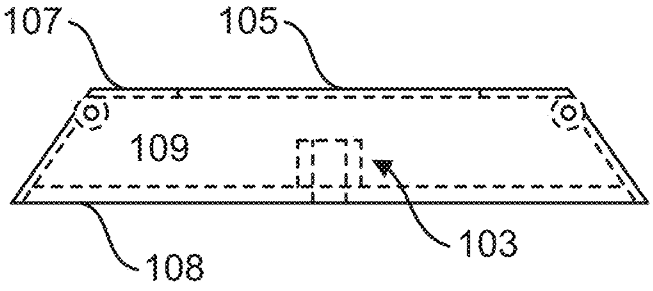
FIG. 4 is a cross-sectional view of the length of the spinner plate in one embodiment.

Turning to FIG. 4, FIG. 4 is a cross-sectional view of the length of the spinner plate in one embodiment. As can be seen, the bottom of the spinner plate 101 is longer than the top of the spinner plate.

FIG. 4 depicts the spinner coupler 103. As noted, the spinner coupler 103 couples to a rotating mechanism, such as a shaft from a motor. The spinner coupler 103 couples to the shaft, for example, such that when the shaft rotates, the spinner coupler 103 rotates the spinner plate 101.

Figure 5:
FIG. 5 is a cross-sectional view of the width of the spinner plate in one embodiment.

FIG. 5 is a cross-sectional view of the width of the spinner plate in one embodiment. As with FIG. 4, the spinner coupler 103 is visible in FIG. 5. FIG. 5 also shows the hinge 106 connectors used to couple with the outer flaps 102.

Figure 6:
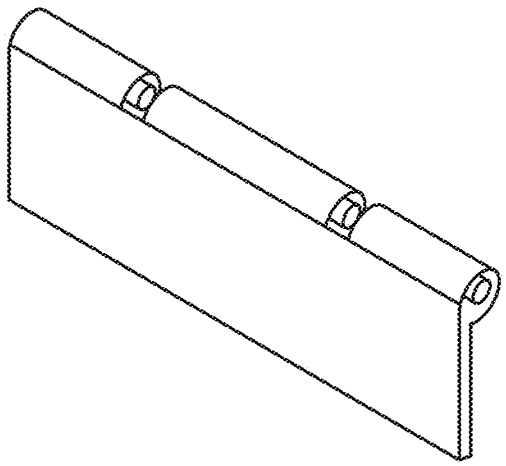
FIG. 6 is a perspective view of the flap in one embodiment.

Turning to FIG. 6, FIG. 6 is a perspective view of the flap in one embodiment. As noted, in one embodiment the flap 102 comprises a width which is greater than the width of the underlying exit 104. In this manner, the flap 102 prevents unwanted entry into the exit 104.

Figure 7:
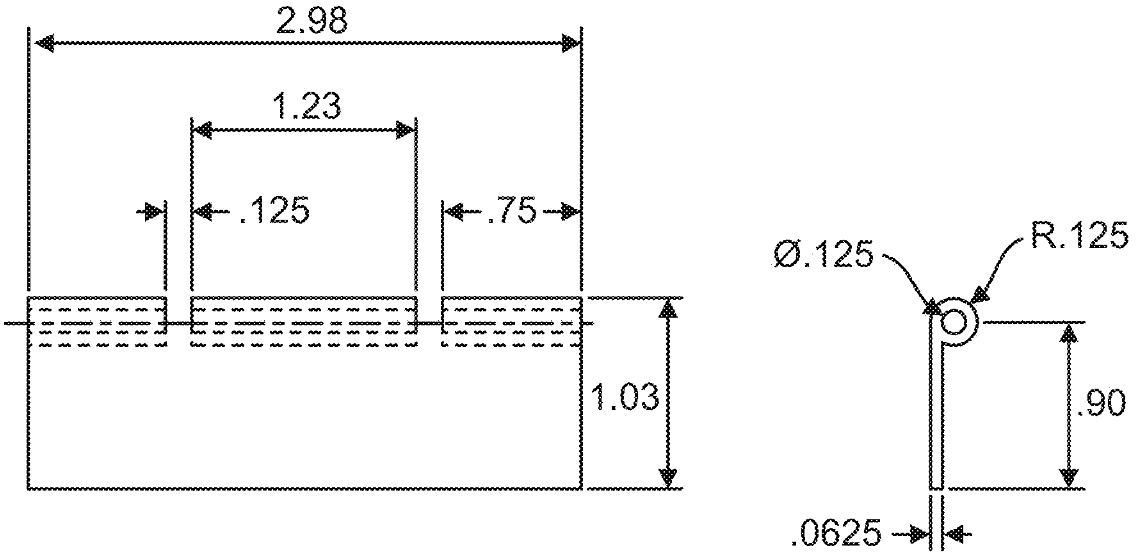
FIG. 7 is an annotated front and side view of the flap in one embodiment.

FIG. 7 is an annotated front and side view of the flap in one embodiment. The flap 102 can comprise virtually any material. It can comprise plastic, metal, rubber, etc., and combinations thereof. As noted above, the outer flap 102 comprises a hinge 106 which can be biased or unbiased.

Figure 8:
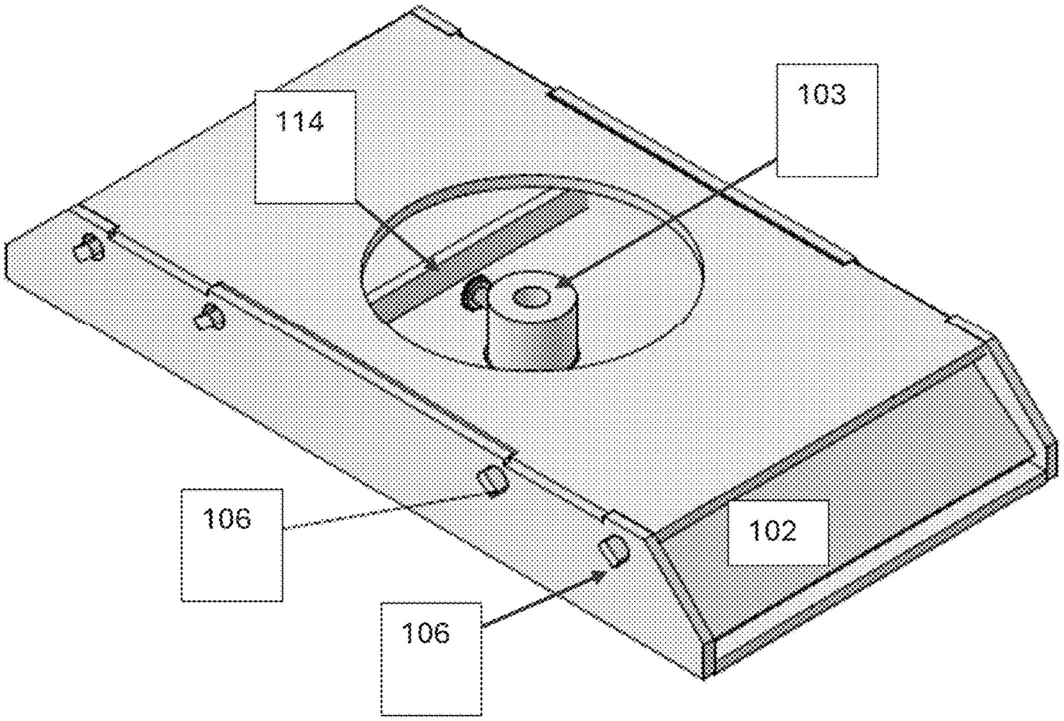
FIG. 8 is a perspective view of a spinner plate with inner and outer flaps in one embodiment.

While one embodiment has been shown which utilizes only outer flaps 102, other embodiments utilize two or more flaps. FIG. 8 is a perspective view of a spinner plate with inner 110 and outer flaps 112 in one embodiment.

In FIG. 8, only the outer flap 102 is visible. That is because the inner flaps 110 are located internally and are not visible on this figure. The inner flap 110 is located at the location of the internal hinge 106. Thus, the inner flap 110 is located between the outer flap 102 and the coupler 103.

Figure 9:
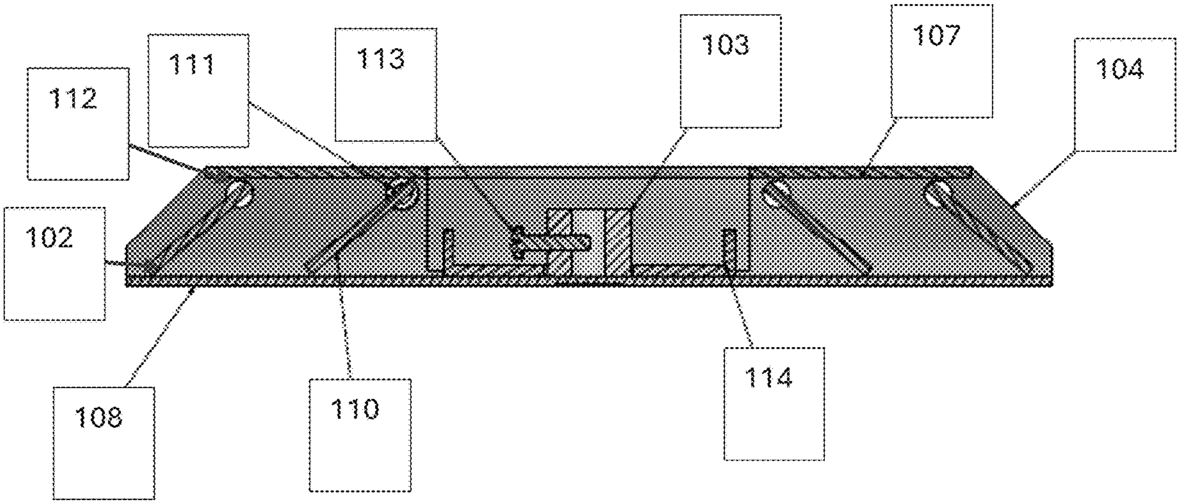
FIG. 9 is a cross-sectional view of the spinner plate in FIG. 8.

Turning now to FIG. 9, FIG. 9 is a cross-sectional view of the spinner plate in FIG. 8. FIG. 9 shows the locations of the outer flaps 102 relative to the inner flaps 110. The outer flaps 102 are located adjacent to the exit 104, whereas the inner flaps 110 are located upstream of the outer flaps 102 closer to the coupler 103. As used herein, upstream and downstream refers to relative locations within the spinner plate. Upstream refers to an item closer to the coupler 103, whereas downstream refers to an object closer to the exits 104. Thus, the inner flaps 110 are upstream of the exit 104. As shown, the outer flaps 102 are upstream of the exit 104.

The inner flaps 110, in some embodiments, are connected to an inner flap spring 111. While the term spring is used, this is used to encompass any biasing mechanism. This can be a spring, coil, memory metal, etc. The inner flap spring 111 biases the inner flap 110 to the closed position wherein the inner flap 110 rests upon the bottom 108. When the force of the inner flap spring 111 is overcome, the inner flap 110 pivots relative to the hinge 106. In so doing, feed can pass under the inner flap 110 and downstream toward the exit 104. If the inner flap 110 is closed, feed cannot pass downstream of the inner flap 110.

As depicted, the outer flaps 102 are connected to outer flap springs 112, which function similar to the inner flap springs 111. As noted, if the outer flaps 102 are closed such that the end of the outer flaps 102 is either touching, or in sufficient proximity to the bottom 108, then feed cannot pass downstream of the outer flaps 102. Likewise, since the outer flaps 102, and the inner flaps 110, cannot pivot counterclockwise beyond the point they intersect the bottom 108, this prevents animals and others from entering the spinner plate through the flaps 102, 110 when closed.

The outer flap springs 112 can comprise the same or different springs as the inner flap springs 111. In one embodiment, the inner flap springs 111 are stronger, and therefore, offer more resistance to opening than the outer flap springs 112. In one embodiment, the inner flap spring 110 is in a naturally closed position. That is, the inner flap springs 111 offer sufficient force to maintain the inner flap 110 in a closed position. Sufficient force must be exerted upon the inner flap 110 to overcome the biasing force of the inner flap spring 111. The same is true for the outer flap springs 112.

In one embodiment, the force which overcomes the inner flap spring 111 to eventually open the inner flap 110 comes in the form of centrifugal force. As noted, once the spinner plate 101 is spun, then centrifugal force acts upon the flaps 110, 102. Once the centrifugal force overcomes the biasing force of the inner flap spring 111, then the inner flap 110 will open. Similarly, once the centrifugal force overcomes the biasing force of the outer flap spring 112, then the outer flap 102 opens. Once the spinning force is reduced or stopped, the biasing force overcomes the centrifugal force, and the flaps 102, 110 once again close. The term biasing force refers to the amount of force exerted by a biasing mechanism, such as a biased hinge. A biased hinge refers to any hinge which is under a bias. Thus, a hinge which is coupled to a spring or other biasing device is a biased hinge.

If the outer flap spring 112 has less biasing force than the inner flap spring 111, then the outer flap 102 will open more readily. One advantage to this is cleaning out excess feed when the spinner assembly is slowing down. If the spinner assembly 101 is spinning at high RPMs sufficient to deliver feed, then the outer flaps 102 and the inner flaps 110 are open. This allows feed to be dispersed. However, if the inner flap springs 111 and the outer flap springs 112 had the same strength, both flaps 102, 110 could shut at the same, or very similar time. Conversely, by having the springs have dissimilar strengths, the outer flaps 102 close at different times than the inner flaps 110. If the outer flap spring 112 is weaker, then the outer flap 102 will remain open longer. As the spinner assembly slows down, the inner flap 110 will close first. This stops additional feed from going downstream of the inner flaps 110. However, there is still feed located downstream of the inner flaps 110. Because the outer flap spring 112 is comparatively weaker, the outer flap 102 remains open even at low RPMs, and after the inner flaps 110 have closed. This allows any additional feed to leave through the exit 104. If all flaps 102, 110 closed simultaneously, then feed can remain between the flaps 102, 110.

Additionally, in some embodiments, feed can become trapped between the outer flap 102 and the bottom 108 of the spinner plate 101. This prevents the outer flap 102 from fully closing, and is as such, undesirable. However, by staggering the closing of the flaps 102, 110, the main flow of the feed is stopped to allow any remaining feed to be dispersed. When the spinner plate 101 is fully stopped, generally all of the feed which was downstream of the inner flap 110 has exited the feeder. This allows the outer flap 102 to fully close.

As shown, the spinner plate 101 has two exits 104. As such, as depicted, the spinner plate 101 has two inner flaps 110 which face opposite directions, and two outer flaps 102 which face opposite directions. This allows feed to be spread through both opposing ends of the spinner plate 101.

The springs, or biasing mechanisms, for the flaps 102, 110 can vary depending upon the desired application. In one embodiment the outer flaps 102 each comprise a single 0.6 mm spring whereas the inner flaps 110 each comprise two 1 mm springs. Thus, in such embodiments, the inner flap springs 111 are double the biasing force than the outer flap springs 112. In other embodiments the inner flap springs 111 have more than double the biasing force compared to the outer flap springs 112.

FIGS. 8 and 9 also depict a distributor controller 114. As shown, the distributor controller 114 is located upstream of the inner flap 110, but downstream of the coupler 103. The distributor controller 114 is a small planar wall which extends vertically from the bottom 108 of the spinner plate 101. In one embodiment the distributor controller extends for the width of the spinner plate 101. As shown, there is one distributor controller 114 on both sides-one per exit side of the spinner plate 101.

The distributor controller 114 acts as a flow disruptor. As the feed falls through the void 105, it is distributed by the rotation of the spinner plate 101. The distributor controller 114 offers back pressure to the flow of feed. This back pressure sufficiently slows the flow of feed such that the inner flap 110 can close when desired. The distributor controller 114 is not necessary in all embodiments, but the offered back pressure is useful in some embodiments.

As noted, the system and method discussed herein has a variety of benefits. First, the outer flaps 102 keep unwanted pests away from the feed. The additional cost of the flaps 102 is very minimal, but the benefits are substantial. For very little cost, the feeder system can prevent rodents and other animals from eating or contaminating the feed.

Second, the system uses centrifugal force to control whether the spinner plate 101 is in the upward position or the downward position. The relative locations can also protect the feed from unwanted pests.

Third, the system can be used with a variety of feeds. As noted, traditional corn and deer feed can be utilized. Other feeds such as seeds and granular feed products can also be utilized in the same feeder.

The feeder can have various other options such as timers, fences etc. A timer, for example, allows the operator to control when the spinner plate 101 begins dispensing food. This allows for consistency as well as proper rationing and dispensing.

The spinner plate 101 can be powered with a battery, the electrical grid, solar panels, etc.

While the invention has been particularly shown and described with reference to a preferred embodiment, it will be understood by those skilled in the art that various changes in form and detail may be made therein without departing from the spirit and scope of the invention.

What is claimed is:

1. A spinner plate for a feeder comprising:
a void to receive feed;
at least one exit through which feed is dispensed;
at least one outer flap coupled to said at least one exit, and wherein said at least one outer flap comprises a biased hinge;
the spinner plate being moveable between an upward position and a downward position;
a spinner plate top connected to a spinner plate bottom via sides;
wherein said spinner plate top is shorter than said spinner plate bottom; and
wherein said void is located on said spinner plate top;
further comprising at least one inner flap, wherein said inner flap comprises a biased hinge, and wherein said at least one inner flap is located upstream from said at least one outer flap.

2. The spinner plate of claim 1 wherein when said spinner plate is in said upward position, feed can be dispensed.

3. The spinner plate of claim 2 wherein when said spinner plate is in said downward position, feed cannot be dispensed.

4. The spinner plate of claim 1 wherein when said spinner plate is in said downward position, feed can be dispensed.

5. The spinner plate of claim 1 wherein said at least one exit comprises two opposing exits, wherein said two opposing exits are located on opposite ends of said spinner plate, and wherein said spinner plate bottom and said spinner plate top are approximately parallel.

6. The spinner plate of claim 5 wherein said two opposing exits comprise a ramp.

7. The spinner plate of claim 5 wherein each of said two opposing exits comprise one of said at least one outer flap.

8. The spinner plate of claim 5 wherein said void is located on said spinner plate top.

9. The spinner plate of claim 1 wherein said at least one outer flap is wider than said at least one exit.

10. The spinner plate of claim 1 wherein said at least one outer flap comprises a closed position wherein the at least one outer flap is adjacent to said at least one exit and an open position wherein the at least one outer flap is not adjacent to said at least one exit, and wherein feed can be dispensed when the at least one outer flap is in said open position.

11. The spinner plate of claim 1 wherein said at least one inner flap comprises a first biasing force, and wherein said at least one outer flap comprises a second biasing force, and wherein said first biasing force is greater than said second biasing force.

12. The spinner plate of claim 11 further comprising a distributor controller, wherein said distributor controller is upstream of said at least one inner flap.

13. The spinner plate of claim 12 wherein said distributor controller is a partial planar wall which extends vertically above said spinner plate bottom.

14. A spinner plate for a feeder comprising:

a void to receive feed;

two exits on opposite ends of said spinner plate through which feed is dispensed;

two outer flaps adjacent to each exit, and wherein each outer flap comprises a biased hinge;

two inner flaps upstream from the two outer flaps, wherein each inner flap comprises a biased hinge;

a spinner plate top connected to a spinner plate bottom via sides;

wherein said spinner plate top is shorter than said spinner plate bottom; and wherein said void is located on said spinner plate top.

15. The spinner plate of claim 14 further comprising a spring to urge the spinner plate to a downward position.

16. The spinner plate of claim 14 wherein the two inner flaps each comprise a first biasing force, and wherein the two outer flaps each comprise a second biasing force, and wherein said first biasing force is greater than said second biasing force.

17. The spinner plate of claim 14 further comprising a distributor controller, wherein said distributor controller is upstream of the two inner flaps.

* * * * *